United States Patent [19]

Keshavan

[11] Patent Number: 5,045,092
[45] Date of Patent: Sep. 3, 1991

[54] DIAMOND-CONTAINING CEMENTED METAL CARBIDE

[75] Inventor: Madapusi K. Keshavan, Fullerton, Calif.

[73] Assignee: Smith International, Inc., Houston, Tex.

[21] Appl. No.: 357,427

[22] Filed: May 26, 1989

[51] Int. Cl.$^5$ .............................................. B24D 3/00
[52] U.S. Cl. ...................................... 51/293; 51/305; 51/307; 51/309
[58] Field of Search .................. 51/293, 305, 307, 309

[56] References Cited

U.S. PATENT DOCUMENTS

| | | | |
|---|---|---|---|
| 3,745,623 | 7/1973 | Wentorf Jr. et al. | 29/95 B |
| 4,171,973 | 10/1979 | Hara et al. | 51/307 |
| 4,231,762 | 11/1980 | Hara et al. | 51/309 |
| 4,525,178 | 6/1985 | Hall | 51/309 |
| 4,604,106 | 8/1986 | Hall et al. | 51/293 |
| 4,694,918 | 9/1987 | Hall | 51/293 |

Primary Examiner—William R. Dixon, Jr.
Assistant Examiner—Willie J. Thompson
Attorney, Agent, or Firm—Christie, Parker & Hale

[57] ABSTRACT

Cemented tungsten carbide rock bit inserts have diamond particles dispersed therein for enhanced hardness and wear resistance. The cobalt matrix is primarily the face centered cubic crystal structure for enhanced ductility and toughness. Such inserts are formed by introducing excess non-diamond carbon beyond the stoichiometric proportion in the tungsten carbide. The inserts are pressed at a temperature and pressure where diamond is thermodynamically stable and cooled while maintaining the pressure sufficiently high to prevent decomposition of diamond crystals formed at the elevated temperature. Diamond crystals may be dispersed throughout the cemented tungsten carbon or may be more concentrated near the surface than in the interior.

17 Claims, 1 Drawing Sheet

DIAMOND-CONTAINING CEMENTED METAL CARBIDE

FIELD OF THE INVENTION

This invention relates to cemented tungsten carbide articles having diamond particles formed in situ in the metal binder for tungsten carbide particles. In particular, it relates to techniques for making cemented tungsten carbide inserts for rock bits with diamond particles dispersed in the matrix.

BACKGROUND OF THE INVENTION

Oil wells and the like are commonly drilled with rock bits having rotary cones with cemented tungsten carbide inserts. As such a bit is rotated on the bottom of a drill string in a well, the cones rotate and the carbide inserts bear against the rock formation, crushing and chipping the rock for extending the depth of the hole. Typical inserts have a cylindrical body which is pressed into a hole in such a cone and a somewhat blunt converging end that protrudes from the face of the cone. The converging end of the insert may be generally conical, roughly hemispherical, or have a somewhat chisel-like shape. Another type of bit for drilling rock employs a steel body in which similar tungsten carbide inserts are embedded. The bit is hammered against the bottom of the hole for shattering rock and gradually rotated as it drills. Inserts provided in practice of this invention may be used in either type of rock bit, or in other related devices such as underreamers.

Since the tungsten carbide inserts are the parts of the rock bit that engage and drill the rock, it is important to minimize wear and breakage of such inserts. Tungsten carbide inserts for rock bits are made by sintering a mixture of tungsten carbide (WC) powder and cobalt to form a dense body with very little porosity. Two important properties of such inserts are wear resistance and toughness. It is desirable to enhance the hardness of an insert adjacent to its surface where it engages the rock formation and maintain toughness for minimizing breakage of the insert as it is used.

In rock bits designed for a particular type of service, one needs to have an appropriate balance between hardness and toughness. Hard inserts resist wear during drilling. On the other hand, a hard insert may be susceptible to fracture under the impact loads and other abuses necessarily involved in drilling wells. Enhanced toughness is also advantageous, since the part of the insert extending beyond the face of the cone does not need to be as blunt to resist fracture. This means that a longer, more aggressive cutting structure can be employed on a rock bit where fracture toughness is adequate. Thus, soft formation bits may have longer insert protrusion than bits intended for use on harder rock formations.

In essentially all bits, it is desirable to have high hardness and wear resistance and relatively large insert protrusion. Achievement of these desiderata may, however, be limited by a lack of fracture toughness in the main body of the insert. It is desirable to have a hard surface and a tough body. Of course, hardness and toughness throughout the insert is also desirable.

Composite rock bit inserts have been made comprising a layer of polycrystalline diamond on the protruding, converging end of a cemented tungsten carbide insert. This provides a high hardness at the surface and a tough body within the insert. There are appreciable differences in the mechanical and thermal expansion properties of such a polycrystalline diamond layer and the underlying cemented tungsten carbide. A transition layer, comprising a mixture of carbide and diamond crystals, has, therefore, been provided between the polycrystalline diamond layer and the principal body of the carbide insert. Such an insert is shown, for example, in U.S. Pat. No. 4,694,918.

Such an insert may be made by forming a layer of diamond crystals mixed with a small amount of cobalt. Over this there is formed a layer containing a mixture of diamond crystals and precemented tungsten carbide particles. One or more additional layers containing a different proportion of carbide and diamond may be added. A cemented tungsten carbide blank is then placed on the final layer having a mixture of carbide and diamond. This entire assembly is then placed in a very high pressure press and subjected to sufficiently high pressure and elevated temperature to be in a region where diamond is thermodynamically stable. Exemplary minimum temperature is about 1200° C. and an exemplary minimum pressure is about 40 to 45 kilobars.

The assembly is heated and cooled under elevated pressure. This results in formation of a layer of polycrystalline diamond tightly adherent to the cemented tungsten carbide, with one or more transition layers between the polycrystalline diamond and the cemented tungsten carbide body. Such transition layers are a mixture of diamond crystals and precemented tungsten carbide. The polycrystalline diamond layer has high hardness. The cemented tungsten carbide main body of the insert has good toughness. The transition layer or layers help accommodate the differences in thermal expansion and mechanical properties between the polycrystalline diamond and the cemented tungsten carbide.

It is desirable to provide other techniques for forming a transition layer for a rock bit insert having a polycrystalline diamond surface. It is also desirable to provide a rock bit insert having diamond particles distributed in a matrix of tungsten carbide and cobalt. It is also desirable to enhance the wear resistance of a cemented tungsten carbide rock bit insert without significantly degrading toughness.

BRIEF SUMMARY OF THE INVENTION

There is, therefore, provided in practice of this invention, according to a presently preferred embodiment, a method for forming a cemented tungsten carbide article with embedded diamond particles by introducing excess carbon beyond the stoichiometric proportion of tungsten carbide into a mixture of tungsten carbide particles and cobalt. The mixture is pressed into the shape of the desired article and sintered. The sintered part is then pressed at a temperature and pressure where diamond is thermodynamically stable, and it is cooled out of the thermodynamically stable region while maintaining sufficient pressure to prevent decomposition of diamond.

If a uniform distribution of diamond particles is desired throughout the article, excess carbonaceous material such as wax or graphite may be mixed with the carbide and cobalt before pressing. If it is desired to have a higher proportion of diamond particles near the surface and a smaller proportion of diamond in the core of such an article, the article may be carburized and then subjected to elevated temperature and pressure to form diamonds in situ within the matrix for the carbide particles.

BRIEF DESCRIPTION OF THE DRAWINGS

These and other features and advantages of the present invention will be appreciated as the same becomes better understood by reference to the following detailed description and when considered in connection with the accompanying drawings, wherein.

DETAILED DESCRIPTION

Figure 1:
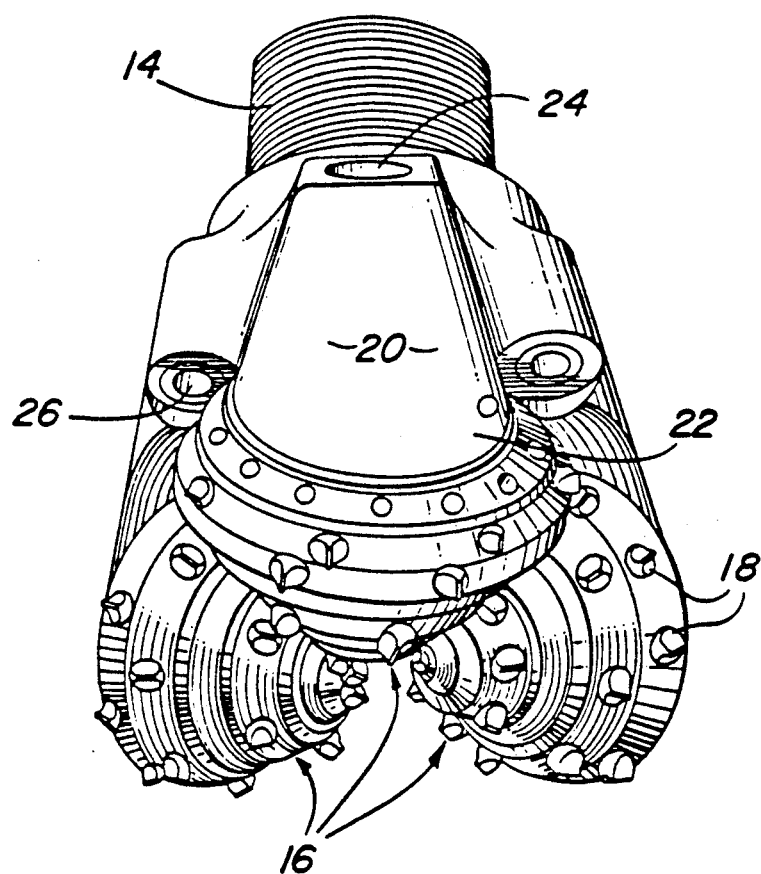
FIG. 1 illustrates a typical, conventional rock bit in which inserts made in practice of this invention are employed.
Figure 2:
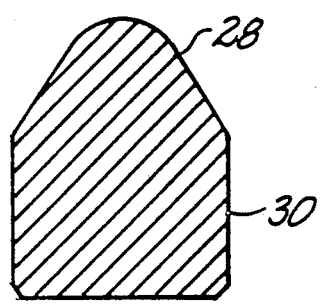
FIG. 2 illustrates an exemplary insert in longitudinal cross section.
Figure 3:
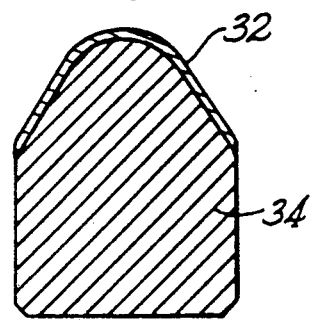
FIG. 3 illustrates, in longitudinal cross section another example of a rock bit insert made in practice of this invention.

Oil and gas wells and the like are commonly drilled with so called three cone rock bits. Such a rock bit has a steel body 20 with threads 14 at its upper end and three depending legs 22 at its lower end. Three steel cutter cones 16 are rotatably mounted on the three legs at the lower end of the bit body. A plurality of cemented tungsten carbide inserts 18 are press-fitted into holes in the surfaces of the cones. Lubricant is provided to the journals on which the cones are mounted from each of three grease reservoirs 24 in the body.

When the rock bit is used, it is threaded onto the lower end of a drill string and lowered into a well. The bit is rotated with the carbide inserts in the cones engaging the bottom of the hole. As the bit rotates, the cones rotate on the body, and essentially roll around the bottom of the hole. The weight on the bit is applied to the rock formation by the carbide inserts and the rock is thereby crushed and chipped by the inserts. A drilling mud is pumped down the drill string to the bottom of the hole and ejected from the bit body through nozzles 26. The mud then travels up the annulus between the drill string and the hole wall. The drilling mud provides cooling and removes chips from the bore hole.

Improved inserts provided in practice of this invention may be made by conventional techniques in the first part of the processing. Thus, a mixture of tungsten carbide powder and cobalt powder is milled with a temporary wax binder. The mixture is pressed to form a "green" compact having the same shape as the completed insert. This shape is in the form of a cylinder 28 with a converging end portion 30 at one end of the cylinder. The converging portion may have any of a number of conventional configurations, including a chisel-like end, a hemispherical end, or a rounded conical end.

The green compacts are loaded into a high temperature vacuum furnace and gradually heated until the temporary binder wax has been vaporized. The temperature is then elevated to about the melting temperature of the cobalt, whereupon the compact is sintered to form an insert of high density, that is, without substantial porosity. The inserts are then relatively slowly cooled in the vacuum furnace. After tumbling, inspection and grinding of the cylindrical body, such inserts have been used for many years in rock bits.

Such a pressed and sintered insert may be used in practice of this invention. In such an embodiment, the sintered insert is carburized in a conventional manner. Either pack, gas, or liquid carburizing may be used. Carburizing involves holding the insert at elevated temperature in an environment with a high carbon pressure so that carbon is introduced through the surface of the insert. Such carbon diffuses into the insert through the cobalt phase serving as a matrix for the tungsten carbide particles. The carbon concentration in the carburized insert, the depth of the carburized material, and the profile of carbon concentration as a function of depth are functions of the time and temperature of carburizing, the composition of the carburizing environment, and the cobalt content of the cemented carbide.

Carburizing sintered tungsten carbide is generally accomplished by packing inserts in a bed of graphite powder and heating in a hydrogen/inert gas mixture or in vacuum. The carburizing introduces excess carbon into the cemented tungsten carbide insert in excess of the stoichiometric proportion of tungsten carbide. Other techniques for carburizing are thoroughly described in *Metals Handbook*, 8th Ed., Vol. 2, American Society for Metals, 1964.

It may be desirable to carburize only the converging end portion of the insert. This may be preferable since, as described hereinafter, the excess carbon is converted to diamond crystals dispersed in the cemented tungsten carbide. Typically, the cylindrical surface of the principal portion of the insert is ground to its final desired dimension as the last step of the process. Although diamond grinding is used, it is preferable to avoid a large proportion of diamond in the cylindrical portion to make grinding easier. To minimize carburization in this region, a conventional "stop off" may be painted on the surface or the surface may be plated with a carbon-resistant material such as copper, as is conventional and well known in the carburizing art.

After carburizing, the cemented tungsten carbide insert is placed in the working volume of a super-pressure press of the type used for synthesizing diamond crystals. A tetrahedral press, cubic press, or belt press is suitable. A technique for pressing the insert is described in U.S. Pat. No. 4,694,918.

The insert, with or without a protective metal can, is surrounded by pyrophyllite or salt so that it is subjected to isostatic pressure. Sufficient pressure is then applied that diamond is thermodynamically stable at the temperatures involved in the process. In an exemplary embodiment, a pressure of 60 kilobars is used. A minimum pressure of about 40 to 45 kilobars should be used. As soon as the assembly containing the insert is at high pressure, current is passed through a graphite heater tube within the press to raise the temperature to at least 1200° C., and preferably, to about 1400° C. Such pressure and temperature are held for 60 seconds so that diamond particles form from the excess carbon in the cobalt phase.

The current is then turned off, and the parts rapidly cool by heat transfer to the water cooled anvils of the press. When the temperature is below about 800° C., and preferably below 200° C., the pressure can be released so that the material in the working volume can be ejected from the press. The insert may then be finished for use by diamond grinding the cylindrical body.

As a result of this treatment, a dispersion of particles forms in the cobalt matrix, which X-ray diffraction confirms includes diamond. It is certain that very hard particles are present in the matrix, and metallographic specimens are harder to polish than ordinary cemented tungsten carbide. Further, graphite inclusions, which commonly occur in cemented tungsten carbide specimens with excess carbon, are no longer present. It appears that there is complete conversion of excess carbon to diamond, except for some residual carbon that may remain in solution in the cobalt matrix.

An insert which has been carburized and treated at high pressure and temperature to form dispersed diamond crystals from the excess carbon may be used in a rock bit where the converging portion of the insert protrudes from the cone and engages the rock formation being drilled. Enhanced wear resistance due to diamonds in the cobalt matrix is useful.

Alternatively, such an insert may be the substrate on which a layer of polycrystalline diamond is formed. The carburized and transformed layer then forms a transition between a layer of polycrystalline diamond 32 and the principal body 34 of the insert. In such an embodiment, diamond crystals and about 6 per cent by volume of cobalt powder are ball milled together. The blended diamond powder and cobalt may then be placed in a zirconium cup or the like having an internal shape corresponding to the shape of the desired insert. The powder is spread into a thin layer by rotation and pressing with an object having the same shape as the insert when it is axisymmetric. The insert itself can be used for spreading the powder. The insert is put in place over the layer of powder and the end of the cup may then be closed with a zirconium disk.

Alternatively, a mixture of diamond powder and cobalt may be blended with a wax and formed into a thin cap for the insert. This assembly is then placed in a super-pressure press and processed in the same manner as hereinabove described. The high pressure and high temperature cause the layer of diamond powder to be formed into a layer of polycrystalline diamond tightly adherent to the cemented tungsten carbide of the insert. The formation of the polycrystalline diamond layer and creation of diamond particles dispersed in the cobalt matrix can be accomplished simultaneously in a single high pressure, high temperature cycle by placing the carburized insert in the press. Alternatively, the diamond particles may be formed in the matrix first, although no advantage to two cycles through the press has been noted.

In still another embodiment, it may be desirable to have diamond particles dispersed throughout the body of cemented tungsten carbide. In that case, the insert may be fabricated from a mixture of powders of graphite, tungsten carbide and cobalt. These powders are mixed, pressed and sintered as hereinabove described.

Alternatively, tungsten carbide and cobalt particles may be mixed with a carbonaceous wax or the like which decomposes to leave a carbonaceous residue, rather than vaporizing during the sintering process. In still another alternative, the original compact may be sintered in a carbonaceous environment, in which case an excess of carbon is obtained more or less throughout the insert. In any of these arrangements, excess carbon beyond the stoichiometric proportion of tungsten carbide is present in the sintered product.

Preferably the amount of excess carbon is in the range of from two to fifteen percent by volume of the composite cemented tungsten carbide. Lower carbon proportions are suitable where the proportion of cobalt binder is low, however, less than about two percent by volume should show such a small benefit that the added cost of processing is not justified.

Concomitantly, higher proportions of carbon are used when the cobalt content is higher. Generally speaking, it is desirable to employ a high cobalt content for enhanced toughness and resistance to breakage. The conversion of carbon to diamond in a higher cobalt composite enhances the wear resistance to offset the usual decrease in wear resistance of higher cobalt grades of cemented carbide. More than about fifteen percent by volume of graphite is undesirable since decreases in toughness may be observed.

In applications where the composite cemented carbide article with diamond particles dispersed in the matrix is to be used as a cutting or machining tool, higher proportions of excess carbon may be useful. Graphite contents up to 50% by volume may be employed where the tungsten carbide content of the composite is concomitantly reduced. Sufficient cobalt should be present for catalyzing substantially complete conversion of graphite to diamond. If the carbon content is too high, cracking of the composite article may be observed due to differential thermal expansion or excessive shrinkage.

When such a cemented tungsten carbide article with excess carbon is then processed in a super-pressure press at temperatures and pressures where diamond is thermodynamically stable, excess carbon in the article is converted to diamond particles dispersed through the cobalt phase.

In addition to the hardening due to presence of very high hardness diamond particles, it appears that such a dispersion of diamond particles has a dispersion hardening effect on the cobalt, resulting in a harder and stronger insert. The enhanced hardness of the cobalt phase by dispersion hardening enhances wear resistance of the inserts. It is believed that wear of cemented tungsten carbide occurs, at least in part, by reason of extrusion of cobalt from between carbide grains, thereby exposing cobalt at the surface where it is subject to wear. Absence of ductile cobalt between carbide grains may then contribute to wear resistance of the tungsten carbide.

In addition, the temperature to which the insert is heated in the super-pressure press is sufficient to transform hexagonal close packed cobalt to a face centered cubic crystal structure which is stable at the elevated temperature and pressure. Rapid cooling in the press from the higher temperature through the phase transformation temperature retains primarily metastable face centered cubic crystal structure in the cobalt matrix.

This is desirable since the face centered cubic structure is substantially more ductile than the hexagonal close packed crystal structure, thereby imparting enhanced toughness to the rock bit insert. Such enhanced toughness is desirable for minimizing susceptibility to breakage of the insert as it is used in a rock bit.

EXAMPLE

Cemented tungsten carbide specimens were made with tungsten carbide particles having an average particle size in the order of 2.5 micrometers. Tungsten carbide powder was mixed with 11 per cent by weight cobalt powder. Three types of specimens were made from such a mixture. The first type was sintered from such a mixture. The second type had an excess of ten per cent by volume of added carbon. The third type was the same as the second, but was then processed at high temperature and pressure for converting carbon to diamond. The inserts were pressed at 60 kilobars at 1400° C. for about 60 seconds in salt, without a sheath. The following table compares the properties of these three types of specimens.

| Sample | Hardness Ra | Density g/cc | Coercivity Oe | Mag Sat % | Wear Scar Depth, mm |
|---|---|---|---|---|---|
| 1 | 88.4 | 14.41 | 90 | 92 | 0.69 |
| 2 | 85.6 | 12.97 | 104 | 92 | 1.38 |
| 3 | 88.9 | 13.56 | 84 | 85 | 0.53 |

The hardness and density decreases between samples 1 and 2 are due to the presence of graphite inclusions in the cemented tungsten carbide. The increased coercivity is probably due to stabilization of the hexagonal close packed crystal structure as a result of increased carbon content and decreased solubility of tungsten in the cobalt phase. The substantially poorer wear resistance is to be expected.

Sample 3 after processing at high temperature and pressure has a hardness and wear resistance greater than that of Sample 1, which is the cemented tungsten carbide without excess carbon. This increase in hardness and wear resistance is consistent with dispersion hardening of the cobalt phase by dispersed diamond particles. The intermediate density of Sample 3 between the densities of Samples 1 and 2, is also consistent with formation of diamond crystals, which are more dense than the graphite. It could be noted, however, that the very high pressures and temperatures could also reduce some inherent porosity in the cemented tungsten carbide following the original processing.

The substantial decreases in coercivity and magnetic saturation are indicative of stabilization of the face centered cubic crystal structure in Sample 3 after high pressure and high temperature processing.

Significantly, Sample 3 which was processed at high temperature and pressure, shows wear resistance better than that of the original cemented tungsten carbide. It should be noted that in the tests set out in the table, the contact area during the wear test of Sample 1 was greater than the contact area of Sample 3. This means that there was less force per unit area applied to the specimen. Even so, the untreated cemented tungsten carbide showed more wear than specimens treated at high temperature and pressure for forming a dispersion of diamond crystals. There is an increase in abrasion resistance of at least 25%, which makes the material particularly suitable for rock bit inserts and for cutting tools for machining metals and abrasive composites.

Metallographic examination showed that the assintered inserts of Sample 2 had voids where graphite inclusions were pulled out during polishing. Sample 3, which was processed at high temperature and pressure, has hard diamond particles embedded in the matrix, some as large as ten micrometers.

Although limited embodiments of cemented metal carbide articles strengthened or hardened by in situ formed diamond particles dispersed in the matrix have been described herein, many modifications and variations will be apparent to those skilled in the art. Thus, for example, the metal carbide is not necessarily entirely tungsten carbide. Tantalum carbide or titanium carbide may be present as well. Thus, for example, where such an article is to be used as a cutting tool or the like, it is desirable to employ titanium carbide.

Iron group metals other than cobalt may also be employed. The iron group metals, such as iron and nickel, are suitable for cementing tungsten carbide particles and may also act as catalyst for synthesis of diamond crystals. Many other modifications and variations will be apparent to those skilled in the art and it is, therefore, to be understood that within the scope of the appended claims the invention may be practiced otherwise than as specifically described.

What is claimed is:

1. A method for forming a cemented tungsten carbide article with embedded diamond particles comprising the steps of:
    introducing excess non-diamond carbon beyond the stoichiometric proportion in tungsten carbide into a cemented tungsten carbide article;
    pressing the article at a temperature and pressure where diamond is thermodynamically stable; and
    cooling the article out of the thermodynamically stable region while maintaining the pressure sufficiently high to prevent decomposition of diamond.

2. A method as recited in claim 1 wherein the introducing step comprises:
    mixing tungsten carbide particles, cobalt and non-diamond carbonaceous material; and
    sintering the mixture into the shape of the article before pressing.

3. A method as recited in claim 2 wherein the carbonaceous material comprises a wax.

4. A method as recited in claim 2 wherein the carbonaceous material comprises graphite.

5. A method as recited in claim 1 wherein the introducing step comprises:
    forming a cemented tungsten carbide article; and
    carburizing the article before the pressing step.

6. A method as recited in claim 5 wherein the carburizing step comprises carburizing the article during the forming step.

7. A method as recited in claim 1 wherein the excess carbon content is in the range of from two to fifteen percent by volume of the cobalt.

8. A method as recited in claim 1 further comprising placing a layer containing diamond crystals adjacent to a surface of the article before the pressing step so that an adherent layer of polycrystalline diamond is formed on the surface of the article upon pressing and cooling.

9. A method for forming a cemented metal carbide article with embedded diamond particles comprising the steps of:
    introducing excess non-diamond carbon beyond the stoichiometric proportion in the metal carbide into a cemented composite article comprising metal carbide particles and iron group metal; and
    subjecting the article to diamond making conditions of high pressure and temperature.

10. A method as recited in claim 9 wherein the introducing step comprises:
    mixing metal carbide particles, iron group metal and non-diamond carbonaceous material; and
    sintering the mixture into the shape of the article before pressing.

11. A method as recited in claim 10 wherein the carbonaceous material comprises graphite.

12. A method as recited in claim 9 wherein the introducing step comprises:
    forming a cemented metal carbide article; and
    carburizing the article before the pressing step.

13. A method as recited in claim 9 wherein the excess carbon content is in the range of from two to fifteen percent by volume of the iron group metal.

14. A method as recited in claim 9 wherein the excess carbon content is up to fifty percent by volume of the composite article.

15. A method for forming an insert for a rock bit comprising the steps of:
  forming a mixture of tungsten carbide and cobalt particles into a rock bit insert;
  including in the insert an excess of non-diamond carbon greater than the stoichiometric proportion in the tungsten carbide; and
  pressing the insert at a sufficient temperature and pressure to form diamond from excess carbon.

16. A method as recited in claim 15 comprising:
  mixing tungsten carbide particles, cobalt and graphite; and
  sintering the mixture before pressing.

17. A method as recited in claim 15 comprising forming the cemented tungsten carbide insert and carburizing the insert before the pressing step.

* * * * *

UNITED STATES PATENT AND TRADEMARK OFFICE
CERTIFICATE OF CORRECTION

PATENT NO. : 5,045,092

DATED : September 3, 1991

INVENTOR(S) : Madapusi K. Keshavan

It is certified that error appears in the above-identified patent and that said Letters Patent is hereby corrected as shown below:

Column 2, line 50, before "carbon" insert -- non-diamond --.

Column 7, lines 47,48, change "assintered" to -- as-sintered --.

Signed and Sealed this

Ninth Day of March, 1993

Attest:

STEPHEN G. KUNIN

*Attesting Officer*     *Acting Commissioner of Patents and Trademarks*